(12) United States Patent
Darnell

(10) Patent No.: US 6,769,399 B2
(45) Date of Patent: Aug. 3, 2004

(54) VEHICLE SPEED CONTROL SYSTEM

(75) Inventor: Paul Malcolm Darnell, Leamington Spa (GB)

(73) Assignee: Ford Global Technologies, LLC, Dearborn, MI (US)

( * ) Notice: Subject to any disclaimer, the term of this patent is extended or adjusted under 35 U.S.C. 154(b) by 45 days.

(21) Appl. No.: 10/214,423

(22) Filed: Aug. 6, 2002

(65) Prior Publication Data
US 2003/0029657 A1 Feb. 13, 2003

(30) Foreign Application Priority Data

Aug. 8, 2001 (GB) .............................................. 0119263

(51) Int. Cl.⁷ .............................................. F02D 41/00
(52) U.S. Cl. .............................. 123/339.19; 123/339.23
(58) Field of Search ....................... 123/339.19, 339.21, 123/339.1, 352; 417/171, 173

(56) References Cited

U.S. PATENT DOCUMENTS

| 5,435,795 | A | * | 7/1995 | Mochizuki et al. ........... 477/39 |
| 5,445,576 | A | * | 8/1995 | Motamedi et al. ........... 477/105 |
| 5,700,227 | A | | 12/1997 | Kosik et al. |
| 5,704,872 | A | * | 1/1998 | Kosik et al. ................... 477/74 |
| 5,876,301 | A | * | 3/1999 | Tabata et al. ................ 477/109 |
| 6,220,223 | B1 | * | 4/2001 | Weisman et al. ........... 123/436 |
| 6,348,771 | B1 | * | 2/2002 | Morimoto et al. .......... 318/139 |

FOREIGN PATENT DOCUMENTS

| DE | 4118375 A1 | 6/1991 |
| GB | 2280721 A | 2/1995 |

* cited by examiner

Primary Examiner—Mahmoud Gimie
(74) Attorney, Agent, or Firm—Davis & Bujold PLLC

(57) ABSTRACT

A vehicle speed control system includes an engine control system with an engine idle speed controller which maintains the engine idle speed set point for varying engine torque outputs and a vehicle braking system for braking the vehicle and which is operated by a deceleration demand means. The idle speed controller is arranged to receive signals from the deceleration demand means such that any increase in engine torque output demanded by the idle speed controller to maintain idle speed is limited in response to signals received from the deceleration demand means.

11 Claims, 2 Drawing Sheets

VEHICLE SPEED CONTROL SYSTEM

FIELD

This invention relates to the control of a vehicle speed and is particularly applicable to vehicles having engine control systems with anti-stall ability.

BACKGROUND OF THE INVENTION

4×4 "off road" vehicles may be equipped with anti-stall systems to prevent the vehicle stalling when traversing surfaces which resist vehicle motion, for example mud and sand. Such systems give the driver confidence when driving off-road and reduces the demands on the driver through clutch and throttle co-ordination.

However, anti-stall systems have a disadvantage in relation to vehicle control in that the system will not allow the vehicle engine speed to drop below that required to maintain the set idle speed, when a driver operates a braking system or a hill descent control system (HDCS). Such a situation may arise during the application of HDCS, or during the application of the brakes when traversing an obstacle. In such situation the idle speed controller "fights" the braking system, with the idle speed controller increasing engine torque to maintain idle engine speed (and hence road speed) and the braking system or HDCS having to apply an increasing braking load to slow the vehicle down.

The situation arises because some 4×4 off-road vehicles are not provided with a low ratio gearbox and road speed associated with the idle set speed may be relatively high. For Example, with an idle speed set point at about 1000 rpm and the vehicle in first gear, this may give a ground speed of up to 10 kph. This idle speed set point may be increased by the engine speed controller for cold starting, operation of air conditioning systems, increased battery loads, etc.

The present invention provides an improved vehicle speed control system.

STATEMENTS OF INVENTION

According to a first aspect of the present invention there is provided a vehicle speed control system having an engine control system with an engine idle speed controller which maintains the engine idle speed at varying engine torque outputs, and a vehicle braking system for braking the vehicle and which is operated by a deceleration demand means wherein the idle speed controller is arranged to receive signals from the deceleration demand means and any increase in engine torque output demanded by the idle speed controller is limited in response to signals received from the deceleration demand means when the braking system is operational.

The braking system may include at least one of a wheel braking system and a transmission braking system which are activated by the deceleration demand means.

The deceleration demand means includes at least one of a driver operable brake pedal, a HDCS, or a stability control system, each of which produces a respective deceleration demand signal and the actual permitted increase in engine torque output may vary depending upon the source of a deceleration demand signal.

When the deceleration demand signal is derived from a driver operated brake pedal for a wheel braking system, the vehicle driver will experience through the brake pedal an increase in braking effort due to an increase in engine torque output which indicates to the driver that the vehicle is being slowed and that the idle speed may drop below the idle speed set point. This increase is limited to minimise additional brake wear, heat input, and braking effort.

When the deceleration demand signal is derived from a stability control system or the HDCS, then the increase in engine torque output is reduced to a minimum so that no excess effort is required from the braking system. This has the benefit of reducing brake wear, increases engine durability, reduces fuel usage and exhaust emissions.

The limited lower torque output demand is not activated instantaneously but is applied progressively so that no instantaneous changes in produced engine torque are generated, provided that said lower torque demand is above the actual torque demand at that instant. This is particularly important when a vehicle ascending a hill in low gear with the engine operating at the idle set point and the driver needing to operate the vehicle brakes. If the lower limit were applied immediately and the engine torque reduced the vehicle may stop and even roll back. With a progressive reduction in torque the vehicle will slow and the driver can take corrective action e.g. increase the throttle torque demand.

DESCRIPTION OF THE DRAWINGS

The invention will be described by way of example and with reference to the accompanying drawings in which.

DETAILED DESCRIPTION OF THE INVENTION

Figure 1:
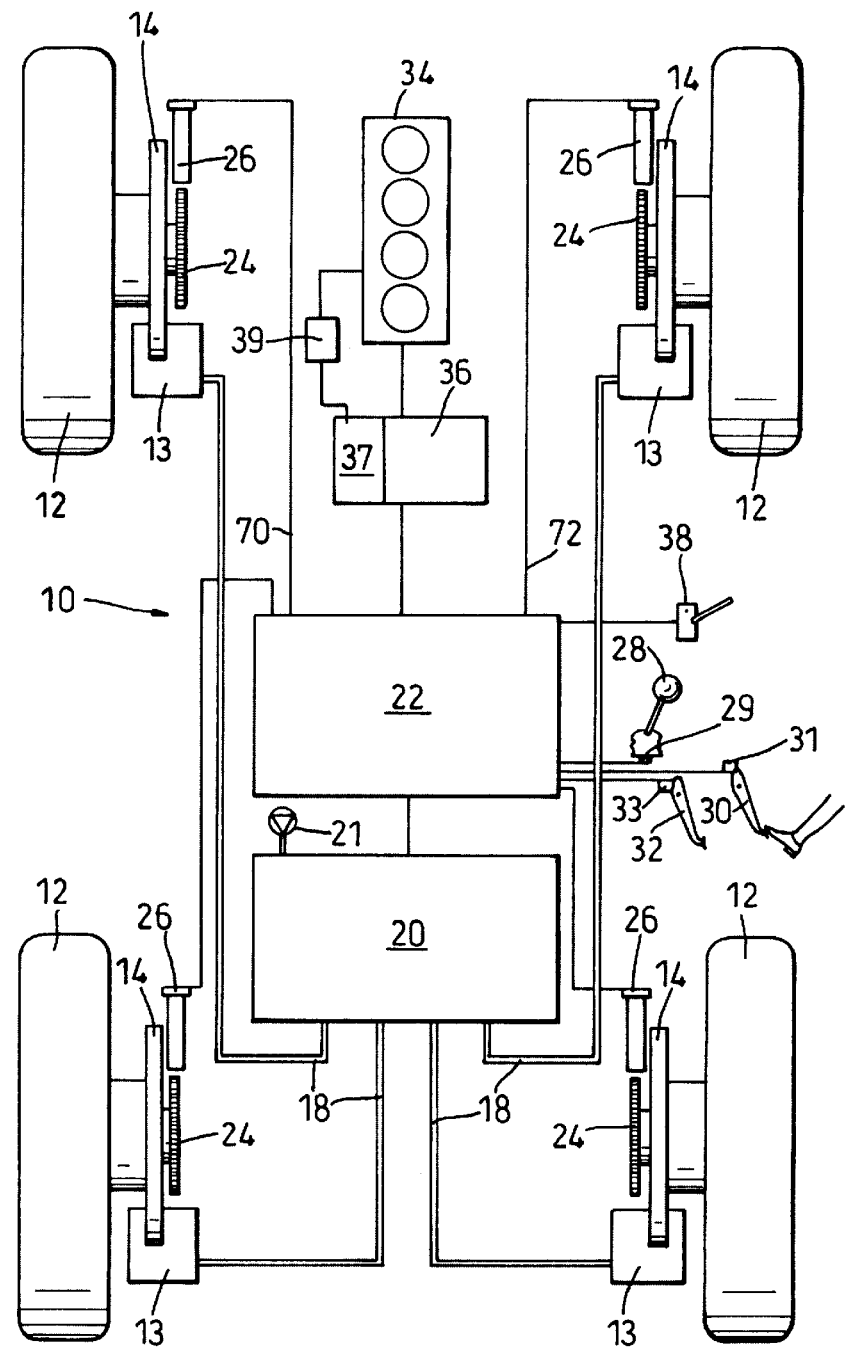
FIG. 1 is a schematic diagram of a vehicle including a system according to the present invention.

With reference to FIG. 1, there is shown a vehicle 10 having four wheels 12 each of which is provided with suitable braking means, preferably a brake disc 14 with co-operating hydraulic callipers 13. The brake callipers are each connected to a hydraulic brake control system 20 via conduit 18. The control system 20 essentially comprises a valve block which controls the hydraulic pressure, generated by a pump 21, to the callipers 13. The control system 20 is operated by a speed control unit 22 which is controlled directly by a driver operating a brake pedal 32, or a hill decent control system switch 38. The hydraulic pressure to the callipers may be manually generated, and/or generated by the pump 21.

The rotational speed of the wheels 12 is monitored by a suitable means, for example each wheel 12 may be provided with a wheel speed sensor 26 which monitors the rotation speed of its respective wheel through a co-rotating toothed wheel 24. Each sensor 26 sends a respective signal indicative of wheel speed to the control unit 22.

The vehicle is powered by an engine 34 whose fuel supply and air supply is controlled by an engine management control system (EMS) 36. The EMS 36 includes an engine idle speed controller 37, typically a PID controller (Proportional, Integral and Differential) which maintains the engine speed at a predetermined set point e.g 1000 rpm. The idle speed control can increase the engine torque output by suitable means for example, change of ignition angle, fuel/air ratio, by operation of an electronically controlled throttle or air by-pass valve 39. The requested torque will increase depending on the gains of the system until a maximum torque is met or the engine speed exceeds the set point. This maximum torque could be the maximum producible by the engine, or a lower limit defined within the EMS 36. The demanded increased torque will be realised by use of ignition angle, throttle control or the air by-pass valve 37.

The vehicle is provided with a gear lever 28 for selecting a particular gear ratio and a sensor 29 associated with lever 28 sends a signal to the control unit 22 indicative of which gear has been selected. The vehicle also has driver operable an accelerator pedal 30 which is provided with a torque demand sensor 31, in this case a potentiometer, which passes a torque demand signal, indicative of accelerator pedal position, to the control unit 22. Similarly, the brake pedal 32 may also be provided with a position sensor 33 which also sends a signal to the control unit indicative of brake pedal position.

In use the vehicle is normally driven with the HDCS switched off at switch 38 and the control unit 22 operating in normal mode. Under these conditions the torque demand signal from the accelerator position sensor 31 is transmitted to the EMS 36. The EMS then controls the fuel and air supply to the engine 34 and the engine drive is transmitted to the wheels 12 at whatever gear ratio has been selected by the driver or automatic transmission.

The vehicle braking is also controlled in a conventional manner with the braking pressure being controlled by the driver through the brake pedal 32, subject to stability control functions (anti-lock & traction control) provided by the control unit 22. These control functions are carried out through the monitoring of wheel speed sensors 26 and the operation of the brake callipers 13 under the control of the control system 20.

When the switch 38 is switched on by the driver the HDCS becomes active. In this mode the control unit 22 determines from the torque demand signal and the brake position signal a target speed and target torque output for the engine. The control unit then determines the most appropriate manner to achieve the targets and then outputs a control signal for either application of the brakes, or control of the engine output torque.

In order to ensure that the brakes system and engine are not "fighting" each other at low engine speeds, that is below or around the idle speed set point, the control unit 22 operates the EMS 36 so that any increase in engine output torque demanded by the idle speed controller 37 is limited in response to signals received from the brake pedal position indicator, HDCS or the stability control system.

Should the vehicle be provided with a transmission brake (not shown) then the control unit 22 will also limit the increase in torque output in response to actuation of the transmission brake.

The actual permitted increase in output torque will depend upon the source of the deceleration or braking demand. In the case of operation HDCS or ABS the increase in output torque should be negligible. In the case of application of the brakes by the driver, there is small increase in output torque to maintain the idle speed and this will necessitate in an increase in braking effort to slow the vehicle, giving the driver a warning that the engine speed is being slowed below the idle set point.

The limit to the increased torque output should not necessarily be applied immediately in one step but should be applied progressively provided that the new lower limit is above the current engine torque output.

Figure 2:
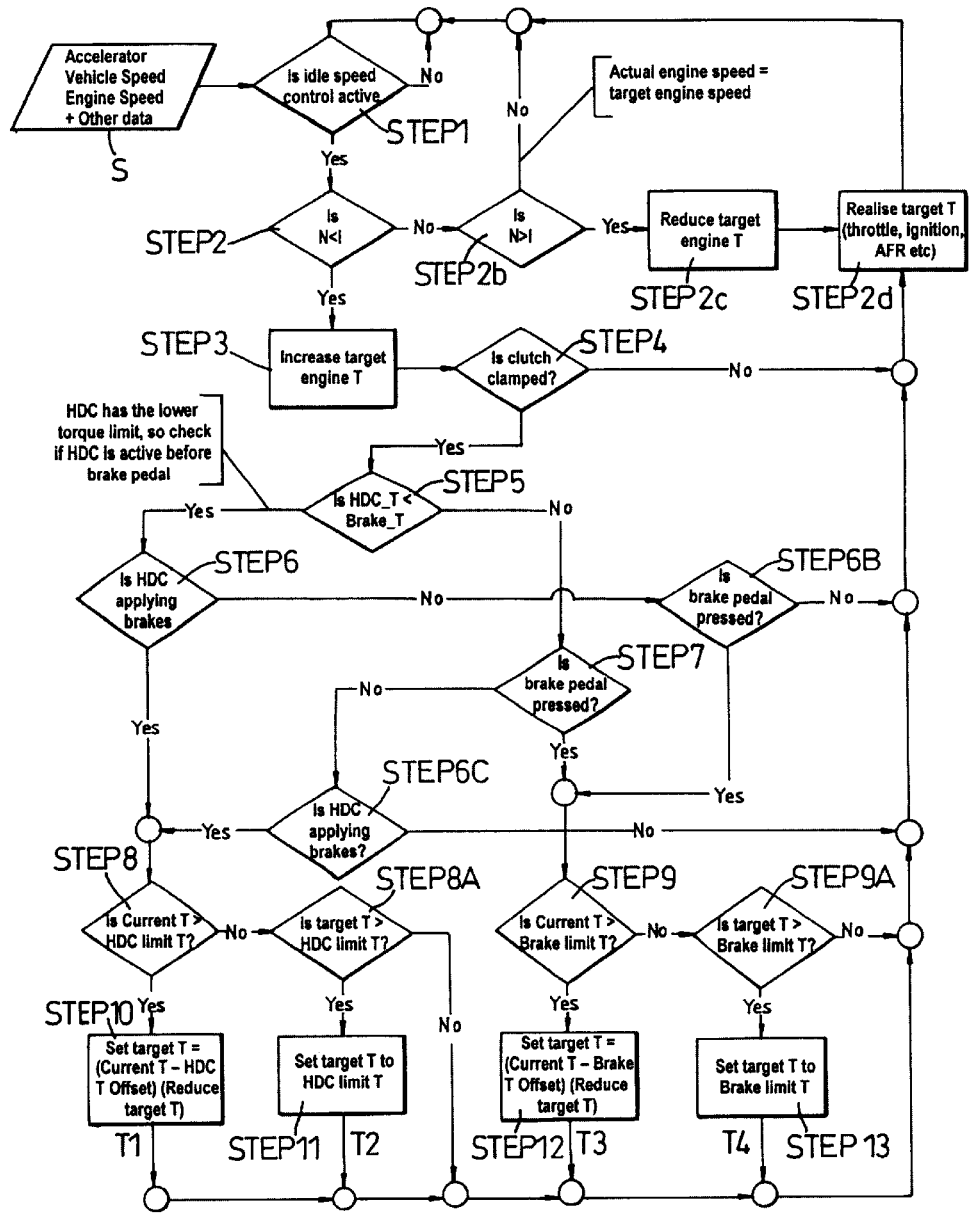
FIG. 2 is a logic flow diagram for the vehicle speed control system according to the present invention.

With reference to FIG. 2, at step 1 a data signal S variously relating to engine speed, vehicle speed, accelerator position etc. is received from the plurality of sensors and, if the idle speed control is active, a signal is passed to step 2.

If the idle speed control is inactive, the signal re-circulates around the control loop.

At step 2 the actual engine speed N is compared with the target set point idle speed I. If N<I then the signal passes to step 3. If N≧I then the signal is passed to Step 2b where it is determined if N>I. If N=I the signal is re-circulated around the control loop and if N>I the signal passes to Step 2c. Step 2c determines that the engine speed N needs to be reduced and hence the engine torque needs to be reduced and the signal passes to step 2d to realise the target engine output torque T which is based on signals T1 T2 T3 & T4 received from Steps 10, 11, 12 and 13 to be described below. The target engine output torque may be realised as described above.

At step 3 it is determined that the target output torque needs to be increased and a signal is passed to a clutch control at step 4.

In step 4, if the clutch is clamped, a signal passes to step 5; if the clutch is partially or fully disengaged, the signal is passed on to step 2d.

Step 5 determines if the HDC torque is less than the braking torque. If yes, the signal passes to step 6; if no, the signal passes to step 7.

Since the HDC has a lower torque limit the control system checks if the HDC is active before checking the operation of the brake pedal. Step 6 determines if the HDC is in operation; if no, a signal passes to Step 6B; if yes, a signal passes to step 8.

Step 6B determines if the brake pedal is being operated. If no, the signal is looped back through Step 2d; if yes, the signal is passed to Step 9.

Step 7 also determines if the brake pedal is being operated; if yes, the signal passes Step 9; if no, the signal passes 6C.

Step 6C determines if the HDC is in operation, similarly to Step 6; if yes, the signal passes to Step 8; if no, the signal is looped back through Step 2d.

The signal from Steps 6 and 6C are received by Step 8 which determines if the actual engine torque is greater than the maximum engine torque allowed when the HDC is in operation. If yes, the signal passes to Step 10; if no, the signal passes to Step 8A.

Step 10 sets a new target engine torque T1 based on the actual engine torque output less a maximum allowable step reduction in torque with the HDC in operation. The set target torque signal T1 is then looped through to step 2d.

Step 8A determines if the target engine torque output (that is the torque required to maintain the set point idle speed) is greater than the maximum engine torque output allowed when the HDC is operating. If yes, the signal passes to Step 11; if no, the signal is looped back to Step 2d.

Step 11 sets a new target engine torque output to the maximum allowed HDC limit and the signal T2 is then looped to Step 2d.

The signals from Step 6B and Step 7 are received in Step 9 which determines if the actual engine torque is greater than the maximum allowed engine torque when the driver is applying the brakes. If yes, the signal passes to step 12; if no, the signal passes to Step 9A.

Step 12 sets a new target engine torque based on the actual engine torque less a maximum allowable step reduction in engine torque when braking.

The set target signal T3 is looped to Step 2d.

Step 9a determines if the target torque to maintain the set point idle speed is greater that the maximum allowed engine torque when applying the brakes. If no, the signal is looped back through Step 2d; if yes, the signal passes to Step 13.

In step 13 a new target signal T4 is set to the maximum allowed engine torque when applying the brakes. The signal T4 is then looped back to Step 2d.

What is claimed is:

1. A vehicle speed control system for a vehicle having an engine control system with an vehicle engine idle speed controller which maintains the vehicle engine idle speed set point for varying engine torque outputs, and a vehicle braking system for braking the vehicle and which is operated by a deceleration demand means, and in said speed control system the idle speed controller is arranged to receive signals from the deceleration demand means, and is operable so that any increase in engine torque output demanded by the idle speed controller is limited in response to signals received from the deceleration demand means, when the braking system is operational.

2. A control system as claimed in claim 1, wherein the vehicle braking system includes at least one of a wheel braking system and a transmission braking system.

3. A control system as claimed in claim 1, wherein the deceleration demand means includes at least one of a driver operable brake pedal, a hill decent control system, or a stability control system, each of which produces a respective deceleration demand signal.

4. A control system as claimed in claim 3, wherein the actual permitted increase in engine torque output varies depending upon the source of a deceleration demand signal.

5. A control system as claimed in claim 4 which is operable such that when the deceleration demand signal is derived from a driver operated brake pedal for a wheel braking system, the vehicle driver will experience through the brake pedal an increase in braking effort due to an increase in engine torque output which indicates to the driver that the vehicle is being slowed and that the idle speed may drop below the idle speed set point.

6. A vehicle speed control system for a vehicle having an engine control system with a vehicle engine idle speed controller which maintains the vehicle engine idle speed set point for varying engine torque outputs, and a vehicle braking system for braking the vehicle and which is operated by a deceleration demand means which includes at least one of a driver operable brake pedal, a hill decent control system, and a stability control system, each of which produces a respective deceleration demand signal, and in said speed control system the idle speed controller is arranged to receive signals from the deceleration demand means, and is operable so that any increase in engine torque output demanded by the idle speed controller is limited in response to signals received from the deceleration demand means, when the braking system is operational and the actual permitted increase in engine torque output varies depending upon the source of a deceleration demand signal such that when the deceleration demand signal is derived form the stability control system, then the increase in engine torque output is reduced to a minimum.

7. A method of controlling the speed of a vehicle with a vehicle speed control system having an engine control system with an engine idle speed controller which maintains the engine idle speed set point for varying engine torque outputs, and vehicle braking system for braking the vehicle and which is operated by a deceleration demand means wherein in said method the idle speed controller receives signals from the deceleration demand means and any increase in engine torque output demanded by the idle speed controller is limited in response to signals received from the deceleration demand means when the braking system is operational.

8. A vehicle speed control system for a vehicle having an engine control system with a vehicle engine idle speed controller which maintains the vehicle engine idle speed set point for varying engine torque outputs, and a vehicle braking system for braking the vehicle and which is operated by a deceleration demand means which includes at least one of a driver operable brake pedal, a hill decent control system (HDCS), and a stability control system, and each of which produces a respective demand signal, and in said speed control system the idle speed controller is arranged to receive signals from the deceleration demand means, and is operable so that any increase in engine torque output demanded by the idler speed controller is limited in response to signals received from the deceleration demand means, when the braking system is operational and the actual permitted increase in engine torque output varies depending upon the source of a deceleration demand signal is derived from the HDCS, then the increase in engine torque output is reduced to a minimum.

9. A control system as claimed in claim 8, wherein the limited torque output demand is not activated instantaneously but is applied progressively, provided that said limited demand is above the actual torque demand at that instant.

10. A control system as claimed in claim 8, wherein the vehicle braking system includes at least one of a wheel braking system and a transmission braking system.

11. A control system as claimed in claim 8, which is operable such that when the deceleration demand signal is derived from a driver operated brake pedal for a wheel braking system, the vehicle driver will experience through the brake pedal an increase in braking effort due to an increase in engine torque output which indicates to the driver that the vehicle is being slowed and that the idle speed may drop below the idle speed set point.

* * * * *